(12) United States Patent
Verma

(10) Patent No.: US 11,465,349 B2
(45) Date of Patent: Oct. 11, 2022

(54) TOOL HEAD ASSEMBLY FOR SOLID STATE ADDITIVE MANUFACTURING

(71) Applicant: The Boeing Company, Chicago, IL (US)

(72) Inventor: Ravi Verma, Chesterfield, MO (US)

(73) Assignee: The Boeing Co., Chicago, IL (US)

(*) Notice: Subject to any disclaimer, the term of this patent is extended or adjusted under 35 U.S.C. 154(b) by 267 days.

(21) Appl. No.: 16/391,065

(22) Filed: Apr. 22, 2019

(65) Prior Publication Data
US 2020/0331203 A1 Oct. 22, 2020

(51) Int. Cl.
| | | |
|---|---|---|
| *B29C 64/218* | (2017.01) | |
| *B29C 64/321* | (2017.01) | |
| *B29C 64/209* | (2017.01) | |
| *B29C 64/141* | (2017.01) | |
| *B33Y 10/00* | (2015.01) | |
| *B33Y 30/00* | (2015.01) | |

(52) U.S. Cl.
CPC .......... *B29C 64/218* (2017.08); *B29C 64/141* (2017.08); *B29C 64/209* (2017.08); *B29C 64/321* (2017.08); *B33Y 10/00* (2014.12); *B33Y 30/00* (2014.12)

(58) Field of Classification Search
CPC ... B29C 64/218; B29C 64/321; B29C 64/141; B29C 64/153; B33Y 10/00; B33Y 30/00; B23K 20/1225; B23K 20/1255; B23K 20/126; B23K 20/1215
See application file for complete search history.

(56) References Cited

U.S. PATENT DOCUMENTS

| | | | |
|---|---|---|---|
| 10,105,894 B1 | 10/2018 | Smiddy | |
| 2007/0119906 A1* | 5/2007 | Mika ................... | B23K 20/1245 228/112.1 |
| 2009/0200275 A1* | 8/2009 | Twelves, Jr. ....... | B23K 20/1215 219/76.1 |
| 2015/0048553 A1* | 2/2015 | Dietrich ................ | B33Y 30/00 264/401 |

(Continued)

FOREIGN PATENT DOCUMENTS

| | | | |
|---|---|---|---|
| CN | 107160030 | * | 9/2017 |
| CN | 107160030 A | * | 9/2017 |

(Continued)

OTHER PUBLICATIONS

"Extended European Search Report Issued in European Patent Application No. 20160910.4", dated Oct. 20, 2020, 8 Pages.

*Primary Examiner* — Joseph S Del Sole
*Assistant Examiner* — Ariella Machness

(57) ABSTRACT

A tool head assembly for a solid state additive manufacturing apparatus includes a tool head having a material passage configured to receive a material therein. The tool head is configured to deposit the material from the material passage onto a substrate of the solid state additive manufacturing apparatus to form at least one layer of the material on the substrate. The tool head includes a shoulder configured to contact the material such that rotation of the tool head frictionally stirs the material. The tool head assembly includes a barrier configured to extend along a side surface of the at least one layer as the at least one layer is deposited onto the substrate such that the barrier is configured to constrain the material from extruding past an edge of the shoulder.

20 Claims, 10 Drawing Sheets

(56) References Cited

U.S. PATENT DOCUMENTS

2020/0189025 A1    6/2020   Rodriguez et al.
2020/0306869 A1*  10/2020   Hardwick ............ B23K 20/128

FOREIGN PATENT DOCUMENTS

| CN | 109604808 A | | 4/2019 | |
| --- | --- | --- | --- | --- |
| CN | 109623180 | * | 4/2019 | |
| GB | 2491472 A | * | 12/2012 | ........... B23K 31/003 |

* cited by examiner

TOOL HEAD ASSEMBLY FOR SOLID STATE ADDITIVE MANUFACTURING

BACKGROUND

Additive manufacturing processes deposit one or more layers of material on a substrate to additively build a structure, for example to fabricate an object, to clad an existing object, or to repair the existing structure of an object. Solid state additive manufacturing processes involve plasticizing feed material to form finished layers, as opposed to other additive manufacturing processes that melt the feed material such as stereolithography, selective laser sintering (SLS), a fused filament fabrication (FFF), and selective laser melting (SLM) processes, etc. One example of a solid state additive manufacturing process is Additive Friction Stir (AFS), which is also commonly referred to as Friction Stir Additive Manufacturing (FSAM). In AFS processes, a rotating tool head is used to rotate and push the feed material (e.g., a rod, a powder, etc.) onto a substrate (or the most recently deposited layer). Under axial loading and rotation, the feed material is locally heated and plasticized such that the feed material extrudes outward under a shoulder of the tool head. As the tool head moves away (e.g., laterally, etc.), the tool head leaves behind a layer of the material that is fused to the substrate (or the most recently deposited layer).

However, in existing systems, the AFS process can generate a relatively significant amount of flash that must be removed via one or more secondary machining processes to finish the structure. For example, the plasticized feed material is constrained from flowing past an edge of the shoulder of the tool head only by the friction generated between the plasticized material and the shoulder. As a result, during the AFS process, plasticized feed material extrudes past the edge of the shoulder (e.g., extrudes out from under the shoulder) and thereby forms flash. The flash generated by AFS processes can be a relatively large amount, for example as much as 50% of the feed material consumed (i.e., deposited) during the process. The secondary machining process required to remove the flash increases the cost and time required to build the structure using an AFS process. To generate less flash, the thickness of the layers deposited during AFS processes has been reduced. However, the reduced layer thickness increases the number of layers required to build the structure, which is more time-consuming and also more costly.

SUMMARY

In one aspect, a tool head assembly is provided for a solid state additive manufacturing apparatus. The tool head assembly includes a tool head having a material passage configured to receive a material therein. The tool head is configured to deposit the material from the material passage onto a substrate of the solid state additive manufacturing apparatus to form at least one layer of the material on the substrate. The tool head includes a shoulder configured to contact the material such that rotation of the tool head frictionally stirs the material. The tool head assembly includes a barrier configured to extend along a side surface of the at least one layer as the at least one layer is deposited onto the substrate such that the barrier is configured to constrain the material from extruding past an edge of the shoulder.

In another aspect, a solid state additive manufacturing apparatus is provided. The solid state additive manufacturing apparatus includes a substrate, and a tool head having a material passage configured to receive a material therein. The tool head is configured to deposit the material from the material passage onto the substrate to form at least one layer of the material on the substrate. The tool head includes a shoulder configured to contact the material such that rotation of the tool head frictionally stirs the material. The solid state additive manufacturing apparatus includes a barrier configured to extend along a side surface of the at least one layer as the at least one layer is deposited onto the substrate such that the barrier is configured to constrain the material from extruding past an edge of the shoulder.

In another aspect, a method is provided for solid state additive manufacturing. The method includes feeding material through a tool head to deposit the material onto a substrate and thereby form at least one layer of the material on the substrate, rotating the tool head as the material is being deposited onto the substrate, contacting the material with a shoulder of the tool head such that rotation of the tool head frictionally stirs the material, and constraining the material from extruding past an edge of the shoulder of the tool head using a barrier that extends along a side surface of the at least one layer as the material is deposited onto the substrate to constrain the material.

DETAILED DESCRIPTION

Figure 1:
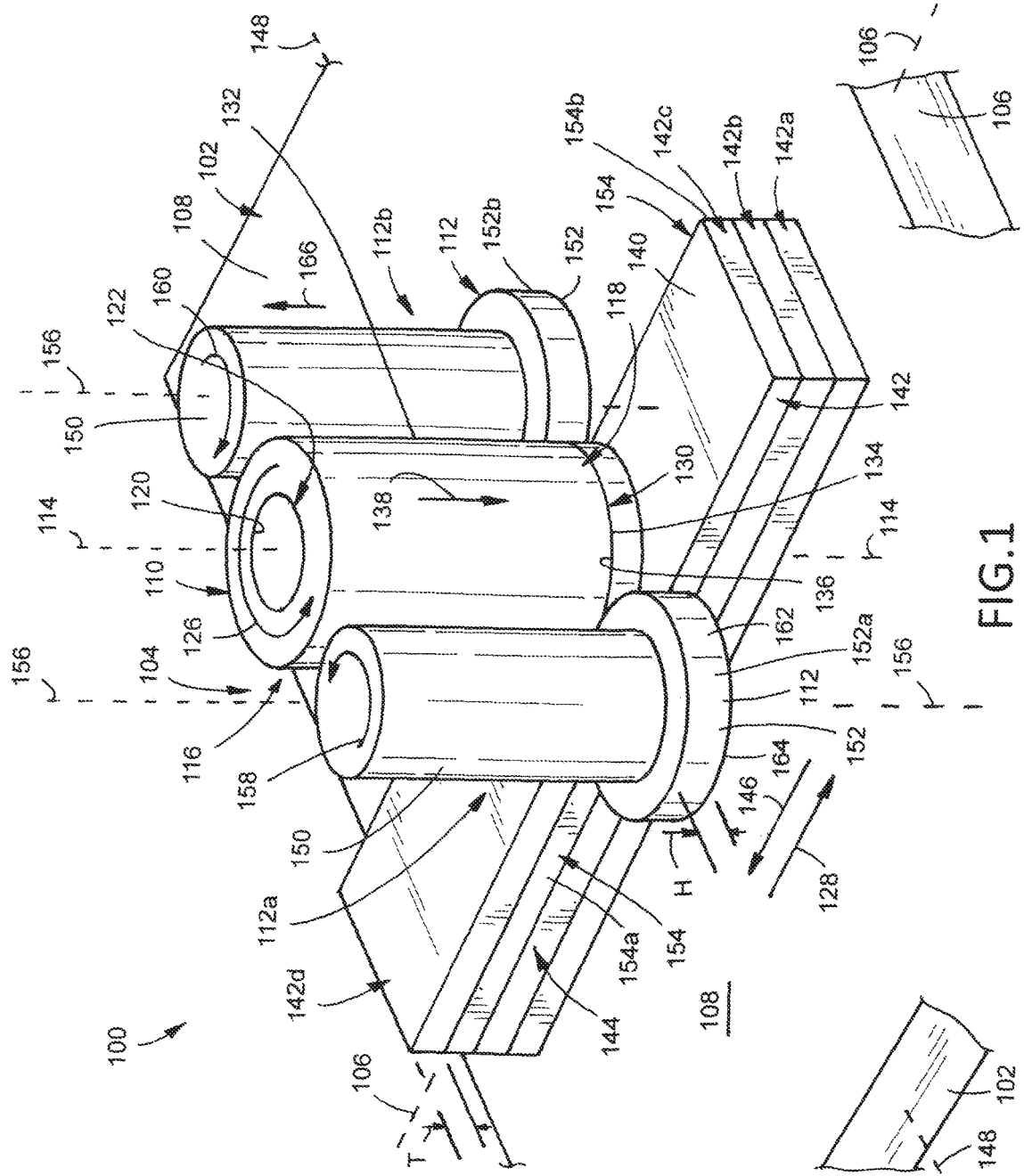
FIG. 1 is a perspective view of an implementation of a solid state additive manufacturing (S SAM) apparatus.

The foregoing summary, as well as the following detailed description of certain embodiments and implementations will be better understood when read in conjunction with the appended drawings. As used herein, an element or step recited in the singular and preceded by the word "a" or "an" should be understood as not necessarily excluding the plural of the elements or steps. Further, references to "one embodiment" or "one implementation" are not intended to be interpreted as excluding the existence of additional embodiments or implementations that also incorporate the recited features. Moreover, unless explicitly stated to the contrary, embodiments "comprising" or "having" an element or a plurality of elements having a particular property can include additional elements not having that property.

While various spatial and directional terms, such as "top," "bottom," "upper," "lower," "vertical," and the like are used to describe embodiments and implementations of the present disclosure, it is understood that such terms are merely used with respect to the orientations shown in the drawings. The orientations can be inverted, rotated, or otherwise changed, such that a top side becomes a bottom side if the structure is flipped 180 degrees, becomes a left side or a right side if the structure is pivoted 90 degrees, and the like.

Certain implementations of the present disclosure provide a tool head assembly for a solid state additive manufacturing (SSAM) apparatus. The tool head assembly includes a tool head having a material passage configured to receive a material therein. The tool head is configured to deposit the material from the material passage onto a substrate of the solid state additive manufacturing apparatus to form at least one layer of the material on the substrate. The tool head includes a shoulder configured to contact the material such that rotation of the tool head frictionally stirs the material. The tool head assembly includes a barrier configured to extend along a side surface of the at least one layer as the at least one layer is deposited onto the substrate such that the barrier is configured to constrain the material from extruding past an edge of the shoulder.

Certain implementations of the present disclosure enable SSAM processes that generate less flash. Certain implementations of the present disclosure reduce the duration of one or more secondary finishing processes (e.g., a machining process, etc.) that are required to finish a structure built using an SSAM process. Certain implementations of the present disclosure reduce the number of secondary finishing processes that are required to finish a structure built using an SSAM process. Certain implementations of the present disclosure eliminate the need for one or more secondary finishing processes. Certain implementations of the present disclosure reduce the amount of time required to build a structure using an SSAM process. Certain implementations of the present disclosure reduce the cost of building a structure using an SSAM process.

Figure 2:
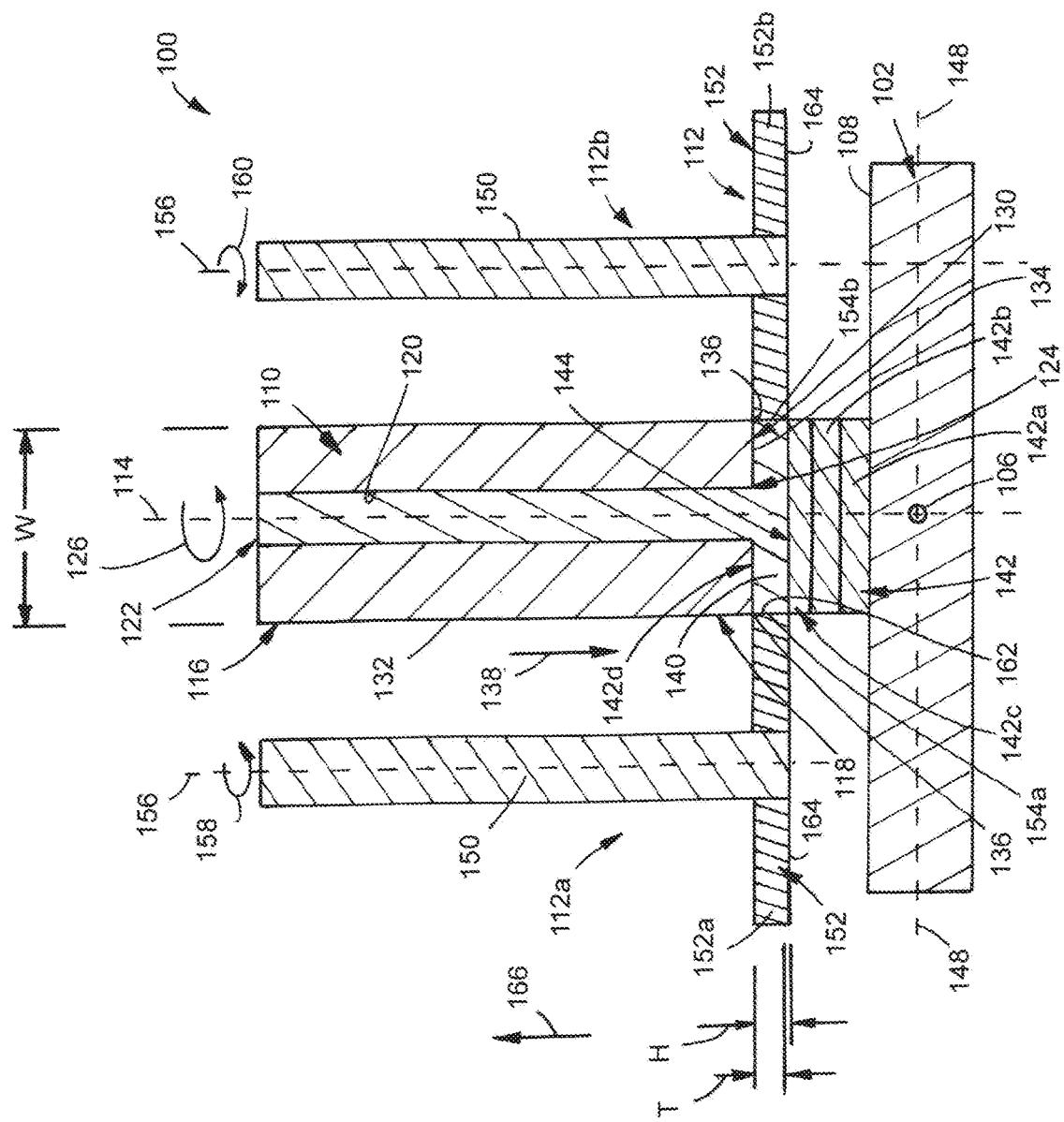
FIG. 2 is a cross-sectional view of the SSAM apparatus shown in FIG. 1.
Figure 3:
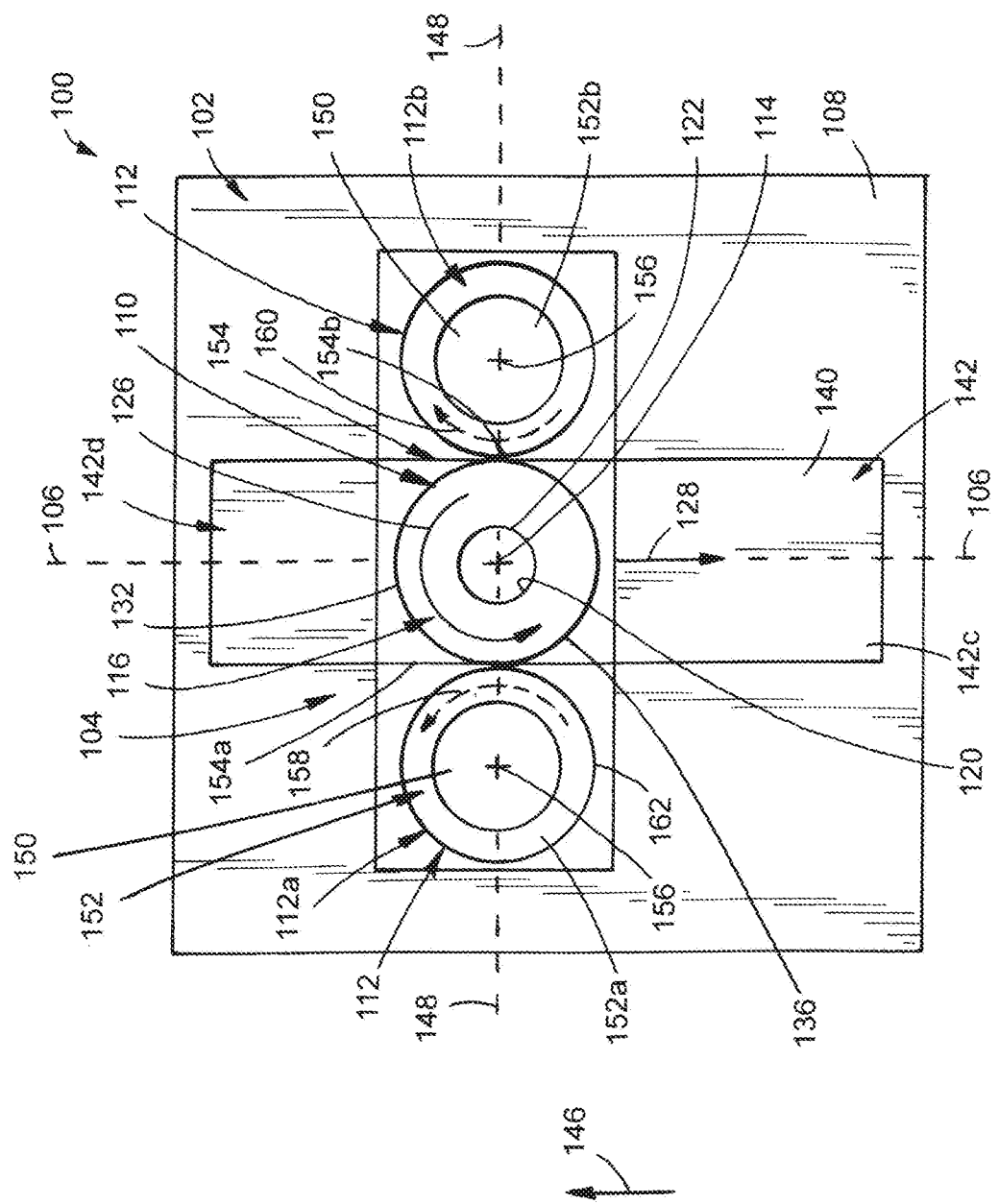
FIG. 3 is a plan view of the SSAM apparatus shown in FIGS. 1 and 2.

With references now to the figures, a perspective view of an implementation of a solid state additive manufacturing (SSAM) apparatus 100 is provided in FIG. 1, while FIGS. 2 and 3 provide cross-sectional and plan views, respectively, of the SSAM apparatus 100. Referring to FIGS. 1-3, the SSAM apparatus 100 is configured to additively build a structure by depositing one or more layers of material on a substrate or an existing object. For example, the SSAM apparatus 100 is used to fabricate an object in some implementations, while in other implementations the SSAM apparatus 100 is used to clad an existing object with a cladding material or to repair the structure of an existing object. In the implementations shown and described herein, the SSAM apparatus 100 is an Additive Friction Stir (AFS) apparatus that is configured to build structures using an AFS process. However, one of ordinary skill in the art guided by the teachings herein will appreciate that the S SAM apparatus 100 is not limited to an AFS process, also commonly referred to as Friction Stir Additive Manufacturing (FSAM). Rather, the present disclosure is applicable to any other type of SSAM process.

As shown in FIGS. 1-3, the SSAM apparatus 100 includes a substrate 102 and a tool head assembly 104. The substrate 102 extends a length along a central longitudinal axis 106 and includes a deposition surface 108. As used herein (e.g., in the claims presented below, in the remainder of the Detailed Description, etc.), a "substrate" is used interchangeably to refer to: (1) a substrate (e.g., the substrate 102) on which one or layers is deposited to fabricate an object; and (2) to an existing object on which one or more layers is deposited for cladding, repairing, and/or the like. Moreover, as used herein (e.g., in the claims presented below, in the remainder of the Detailed Description, etc.), depositing material "onto" a "substrate" is used interchangeably to refer to: (1) depositing material directly onto the deposition surface 108 of the substrate 102; and (2) indirectly depositing the material onto the substrate 102 by depositing the material directly onto an intervening layer of the material that has been previously deposited (e.g., the most recently deposited layer, an uppermost layer, a layer having an exposed surface, etc.). The SSAM process performed by the SSAM apparatus 100 is an open atmosphere process (i.e., does not require the use of a hermetically sealed enclosure). Nevertheless, in some implementations the substrate 102 and the tool head assembly 104 are held within a hermetically sealed enclosure (not shown; e.g., containing an inert gas, etc.).

The tool head assembly 104 includes a tool head 110 and one or more barriers 112. As will be described in more detail below, the one or more barriers 112 are configured to reduce the amount of flash generated by the SSAM process. The tool head 110 extends a length along a central longitudinal axis 114 from an end portion 116 to an opposite end portion 118 (as shown in FIGS. 1 and 2, but not visible in FIG. 3). The tool head 110 includes a material passage 120 that extends through a length of the tool head 110 along the central longitudinal axis 114 from an entrance 122 to a nozzle 124 (as shown in FIG. 2, but not visible in FIGS. 1 and 3). The entrance 122 of the material passage 120 is operatively connected to a source (not shown) of the feed material such that the material passage 120 receives feed material therein from the source. In other words, feed material from the source is fed into the material passage 120 through the entrance 122. As will be described below, the feed material exits the material passage 120 through the nozzle 124 to thereby deposit onto the substrate 102. In some implementations, the feed material is a powder, while in other implementations the feed material has any other form that enables the material to be deposited by the SSAM apparatus 100, for example a wire, a rod, a liquid, etc. Examples of materials that may be used to build a structure using the SSAM apparatus 100 include, but are not limited to, metals, composite metals, other composite materials, polymers, plastics, epoxies, and/or the like.

The tool head 110 is configured to rotate during operation of the SSAM apparatus 100. For example, the tool head 110 is secured to a spindle (not shown) that is operatively connected to a drive means (not shown; e.g., a motor, an engine, etc.). The drive means rotates the spindle, which in turn rotates the tool head 110 about the central longitudinal axis 114. In other implementations, any other type of mechanism is additionally or alternatively used to rotate the tool head 110 about the central longitudinal axis 114. In the implementations shown herein, the tool head 110 rotates about the central longitudinal axis 114 in a counter-clockwise direction, as indicated by an arrow 126. In other implementations, the tool head 110 is configured to rotate about the central longitudinal axis 114 in a clockwise direction or is configured to rotate in both clockwise and counterclockwise directions. Rotation of the tool head 110 about the central longitudinal axis 114 during operation of the SSAM apparatus 100 will be described in further detail below.

The material passage 120 of the tool head 110 includes any cross-sectional shape that enables the tool head 110 to function as disclosed herein. In some implementations, the material passage 120 includes a cross-sectional shape along at least a portion of the length thereof that is complementary with a shape of the feed material (e.g., in implementations wherein the feed material is a rod, etc.) to facilitate rotation of the feed material about the central longitudinal axis 114 along with the tool head 110. In other words, in some implementations the cross-sectional shapes of the material passage 120 and the feed material are complementary such that the feed material is interlocked with the material passage 120 for rotation along with the tool head 110 with a minimal, or no, amount of slippage. In one specific example, the material passage 120 includes a rectangular cross-sectional shape (e.g., square, etc.) along at least a portion of the length thereof and the feed material is a rod having a rectangular cross-sectional shape (e.g., square, etc.) such that the rod is rotationally interlocked with the material passage 120. Any other complementary shape additionally or alternatively is used in other implementations. In at least some implementations wherein the feed material is something other than a rod, feed material in the form of a wire, powder, liquid, or another form rotates along with the tool head 110 during operation of the SSAM apparatus 100, for example due to friction between the feed material and the material passage 120.

The tool head 110 is also configured to move along a length of the substrate 102 during operation of the SSAM apparatus 100. For example, the spindle moves along the central longitudinal axis 106 of the substrate 102, which in turn moves the tool head 110 along the central longitudinal axis 106 (e.g., in a direction of an arrow 128 shown in FIGS. 1 and 3, but not shown in FIG. 2). In another implementations any suitable drive mechanism is used to move the tool head 110 along the central longitudinal axis 106 during operation of the SSAM apparatus 100, for example a motor, an engine, a linear actuator (e.g., screw type linear actuators, hydraulic linear actuators, pneumatic linear actuators, magnetically moveable linear actuators, electrically moveable linear actuators, linear motors, solenoids, wheel and axle actuators, cam actuators, electro-mechanical linear actuators, telescoping linear actuators, etc.). Movement of the tool head 110 along the length of the substrate 102 during operation of the SSAM apparatus 100 will be described in further detail below.

The end portion 118 of the tool head 110 includes a shoulder 130 (shown in FIGS. 1 and 2, but not visible in FIG. 3). Specifically, the tool head 110 includes an outer longitudinal surface 132 that extends along the length of the tool head 110 (i.e., along the central longitudinal axis 114), and an end surface 134 (shown in FIGS. 1 and 2, but not visible in FIG. 3) that intersects the outer longitudinal surface 132 at an edge 136. The end portion 118 of the tool head 110 includes the end surface 134, the edge 136, and a portion of the outer longitudinal surface 132. The shoulder 130 of the tool head 110 is defined by the end surface 134 and the edge 136. The shoulder 130 defines an upper bound of each layer being deposited. As the feed material is deposited onto the substrate 102 to form a layer, the shoulder 130 contacts the deposited material such that the rotation of the tool head 110 frictionally stirs the material, as will be described in further detail below.

Figure 4:
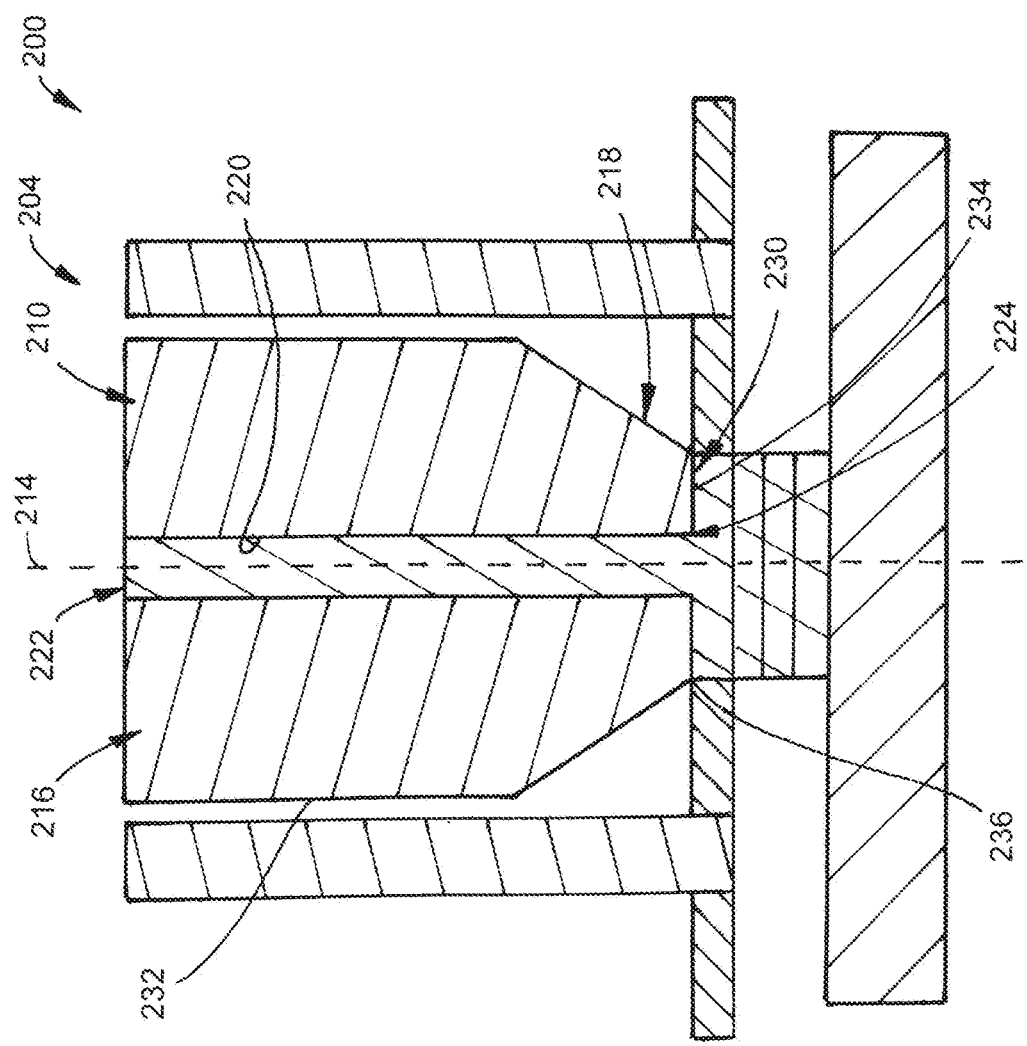
FIG. 4 is a cross-sectional view of another implementation of an SSAM apparatus.

The tool head 110 is not limited to the shape shown in FIGS. 1-3, but rather has any other suitable shape in other implementations. For example, FIG. 4 illustrates another implementation of an SSAM apparatus 200 that includes a tool head assembly 204 having a tool head 210 that includes a tapered shape. The tool head 210 extends a length along a central longitudinal axis 214 from an end portion 216 to an opposite end portion 218. The tool head 210 includes a material passage 220 that extends through the length of the tool head 210 along the central longitudinal axis 214 from an entrance 222 to a nozzle 224. The tool head 210 includes an outer longitudinal surface 232 that extends along the central longitudinal axis 214, and an end surface 234 that intersects the outer longitudinal surface 232 at an edge 236. The end portion 218 of the tool head 210 includes a shoulder 230, and more specifically, the shoulder 230 is defined by the end surface 234 and the edge 236. As can be seen in FIG. 4, the outer longitudinal surface 232 is tapered inwardly toward the central longitudinal axis 214 at the end portion 218 of the tool head 210.

Referring again to FIGS. 1-3, in operation, feed material from the feed material source is fed into the material passage 120 of the tool head 110. As the tool head 110 moves along the length of the substrate 102 (e.g., in the direction of the arrow 128, etc.), the feed material exits the material passage 120 of the tool head 110 through the nozzle 124 such that the feed material is pushed (i.e., deposited) onto the substrate 102. In the implementation shown in FIGS. 1-3, the feed material is deposited directly onto an upper surface 140 of an intervening layer 142c that has been previously deposited onto the substrate 102, such that the feed material is indirectly deposited onto the substrate 102 to form a layer 142d. Although the intervening layer 142c is the most recently deposited layer in the implementation shown in FIGS. 1-3, in other implementations the layer 142d is deposited onto an exposed surface of a layer that is not the most recently deposited layer.

As the tool head 110 moves along the substrate 102 and deposits the feed material onto the substrate 102, the tool head 110 frictionally stirs the feed material. Specifically, the tool head 110 is axially loaded along the central longitudinal axis 114 in a direction of an arrow 138 (as shown in FIGS. 1 and 2, but not labeled in FIG. 3) such that the feed material extrudes outward under the shoulder 130 of the tool head 110 (i.e., between the upper surface 140 of the intervening layer 142c and the end surface 134 of the shoulder 130). Contact between the shoulder 130 of the tool head 110 and the deposited material, the rotation of the tool head 110 (and the feed material in at least some implementations) about the central longitudinal axis 114, and downward pressure resulting from the axial loading generate friction that heats and thereby plasticizes the deposited material. As the plasticized material cools, the plasticized material solidifies to fuse the plasticized material to the intervening layer 142c and thereby form a finished layer 142d (the finished layer 142d is shown as only partially finished in FIGS. 1-3). Accordingly, as the tool head 110 moves along the substrate 102, the tool head 110 leaves behind a layer of material (i.e., the finished layer 142d) that is fused to the intervening layer 142c. Optionally, the tool head 110 includes a pin or other protrusion (not shown) that extends outward from the shoulder 130 in the direction of the arrow 138 to facilitate stirring the material.

As shown in FIGS. 1-3, the layer 142d being deposited is a fourth layer. Specifically, a structure 144 being built using the SSAM process of the SSAM apparatus 100 in FIGS. 1-3 includes a first layer 142a, a second layer 142b, a third layer 142c (e.g., the intervening layer 142c), and the fourth layer 142d (e.g., the finished layer 142d). Once finished, the structure 144 includes any number of the layers 142 (e.g., four or more layers, etc.). In other implementations, the structure 144 includes any number less than four layers 142 (e.g., three layers, two layers, or one layer).

The implementations shown herein illustrate the tool head 110 as moving along the central longitudinal axis 106 in the direction of the arrow 128 to form the illustrated exemplary layers having the shape of elongated strips (e.g., the illustrated layers 142a-d, etc.). The relatively simple parallelepiped shapes of the layers (e.g., the layers 142, etc.) and the overall structures (e.g., the structure 144, etc.) built using the implementations shown herein are meant as examples merely to show the general operation of the SSAM apparatus 100. In other words, the SSAM apparatus 100 is not limited to depositing layers nor building structures having the shapes shown herein. Rather, the tool head 110 is configured to move in any direction(s) along the substrate 102 (whether straight, whether parallel, perpendicular, or oblique relative to the central longitudinal axis 106, etc.) to form layers having any shape(s) and to build structures having any shape(s). For example, in some implementations the tool head 110 is configured to move along the central longitudinal axis 106 in an opposite direction 146 (shown in FIGS. 1 and 3, but not labeled in FIG. 2) in addition or alternatively to moving in the direction of the arrow 128. In some implementations, the tool head 110 is configured to move along a width (i.e. along a central longitudinal axis 148) of the substrate 102 in addition or alternative to moving along the central longitudinal axis 106. Moreover, in some implementations, the tool head 110 is configured to move in one or more directions (i.e., along a path) that is not linear (i.e., is not straight), for example along a path that includes one or more curves, along the path of a wave, along a path that includes one or more bends, corners, and/or the like, etc.

Moving the tool head 110 along the substrate 102 in one or more other directions (whether parallel to the central longitudinal axis 106) in addition or alternatively to the direction of the arrow 128 enables the SSAM apparatus 100 to form one or more layers with a different orientation, shape, and/or the like as compared to the layers shown herein (e.g., a more complex layer shape, a different finished structure shape, etc.). In one specific example, some layers are deposited by moving the tool head 110 along the central longitudinal axis 106, while other layers are deposited by moving the tool head 110 along the central longitudinal axis 148, for example to build a net-shaped structure. Another example includes moving the tool head 110 along a path that includes one or more curves to build a structure that includes one or more curved shapes. Yet another example includes moving the tool head 110 along a path that includes one or more bends, corners, and/or the like to build a structure that includes extends along a non-linear path.

As described above, the tool head assembly 104 includes one or more barriers (e.g., barriers 112) that reduce the amount of flash generated by the SSAM process. In the implementation shown in FIGS. 1-3, each of the barriers 112 includes a support shaft 150 and a bearing 152. As can be seen in FIGS. 1-3, the bearing 152 of each of the barriers 112 extends along a corresponding side surface 154 of the layer being deposited (e.g., the layer 142d). Specifically, the bearing 152a of a barrier 112a extends along the side surface 154a of the layer 142d, while a bearing 152b of the barrier 112b extends along the side surface 154b of the layer 142d. As can be seen in FIGS. 1-3, the side surface 154a of the layer 142d extends opposite the side surface 154b. Each of the barriers 112a and 112b may be referred to herein as a "first" and/or a "second" barrier. Each of the side surfaces 154a and 154b may be referred to herein as a "first" and/or a "second" side surface.

In the implementation of FIGS. 1-3, the bearing 152 of each of the barriers 112 is a roller that is configured to freely rotate about an axis of rotation 156. In operation, the barriers 112 move along with the tool head 110 as the tool head 110 moves relative to the substrate 102 (e.g., along the central longitudinal axis 106, along the central longitudinal axis 148, etc.) to deposit the layer 142d onto the substrate 102. As the barriers 112 move with the tool head 110 along the substrate 102, friction between the bearings 152a and 152b and the material being deposited and/or friction between the bearings 152a and 152b and the outer longitudinal surface 132 of the tool head 110 causes the bearings 152a and 152b to rotate about the corresponding axis of rotation 156 in respective directions 158 and 160. Accordingly, the roller of each bearing 152 rotates about the axis of rotation 156 as the barriers 112 move along the length of the layer 142d during deposition of the layer 142d by the tool head 110.

As the layer 142d is deposited onto the substrate 102 by the tool head 110, the bearings 152a and 152b extend along the respective side surfaces 154a and 154b such that the bearings 152 constrain the plasticized material of the layer 142d from extruding past the edge 136 of the shoulder 130. Specifically, the bearings 152 provide physical barriers along the side surfaces 154 that reduce the amount of plasticized material that flows past the edge 136 and thereby extrudes out from under the shoulder 130. Thus, the barriers 112 reduce the amount of flash generated as the layer 142d is deposited onto the substrate 102. Accordingly, as each successive layer 142 of the structure 144 is deposited onto the substrate 102, the barriers 112 constrain the plasticized material from extruding out from under the shoulder 130 and thereby reduce the amount of flash formed on the structure 144. In some implementations, the barriers 112 reduce the amount of flash generated by the SSAM deposition process by at least approximately 50%, between approximately 25% and approximately 75%, at least approximately 90%, and/or the like.

By reducing the amount of flash of a fully built structure 144, some implementations of the barriers 112 reduce the duration and/or number of one or more secondary finishing processes (e.g., a machining process, etc.) that are required to finish the structure 144 built using the SSAM apparatus 100. In some implementations, the barriers 112 eliminate the need for one or more secondary finishing processes. Accordingly, some implementations of the SSAM apparatus 100 reduce the amount of time required to build the structure 144 using an S SAM process and/or reduce the cost of building the structure 144 using an SSAM process.

In some implementations, a height H (shown in FIGS. 1 and 2, but not labeled in FIG. 3) of one or more of the bearings 152 relative to a thickness T (shown in FIGS. 1 and 2, but not labeled in FIG. 3) of the layer 142d is selected to facilitate reducing an amount of flash generated during deposition of the layer 142d. For example, in some implementations, one or more of the bearings 152 has a greater height H as compared to the thickness T of the layer 142d such that the bearing 152 extends along the central longitudinal axis 114 past the upper surface 140 of the layer 142c (as is shown in FIGS. 1 and 2) and/or extends along the central longitudinal axis 114 past the edge 136 of the shoulder 130. In other implementations, the height H of one or more of the bearings 152 is approximately equal to the thickness T of the layer 142d, such that upper and lower surfaces of the bearing 152 are approximately aligned with the edge 136 and the upper surface 140 of the layer 142c, respectively.

In the implementation shown in FIGS. 1-3, the rollers of the bearings 152 are mounted to a corresponding support shaft 150 such that the bearings 152 freely rotate with respect to the support shaft 150. In other implementations, the support shafts 150 are configured to freely rotate about the axis of rotation 156 and the rollers of the bearings 152 are fixedly secured to the support shafts 150 for rotation therewith.

As described above, the barriers 112 move along with the tool head 110 as the tool head 110 moves relative to the substrate 102 to deposit the layer 142d onto the substrate 102. In some implementations, one or more of the barriers 112 is mounted to a common fixture (not shown) with the tool head 110 such that the common fixture moves both the tool head 104 and the barriers 112 along the substrate 102 to deposit the layer 142d. Moreover, in some implementations one or more of the barriers 112 is mounted to a different fixture (not shown) that is configured to move along with the fixture that moves the tool head 110 to deposit the layer 142d.

In the implementation shown in FIGS. 1-3, two barriers 112a and 112b are provided; however, in some implementations only one barrier 112 is used during deposition of one or more of the layers 142 of the structure 144. For example, when depositing a layer 142 directly adjacent to (e.g., side-by-side, etc.) a layer 142 that has been previously deposited onto the substrate 102, in some implementations a side surface (not shown) of the previously deposited layer 142 is used as a barrier along one side surface 154 of the layer 142 being deposited in place of one of the barriers 112.

As should be apparent from the above description, the barriers 112 control the width W (i.e., the distance between the opposite side surfaces 154) of the layers 142. In the implementation shown in FIGS. 1-3, radially outermost surfaces 162 of the bearings 152 that define the circumferences of the bearings 152 are approximately aligned along the central longitudinal axis 148 with the edge 136 of the shoulder 130 of the tool head 110, as is best seen in FIGS. 2 and 3. In some implementations, the radially outermost surface 162 of one or more of the bearings 152 is selectively positionable to extend past the edge 136 in a direction generally toward the central longitudinal axis 114 of the tool head 110, such that the one or more of the bearings 152 extends under the end surface 134 of the shoulder 130. In other words, instead of being aligned along the central longitudinal axis 148 with the edge 136, the radially outermost surface 162 of the one or more of the bearings 152 is offset from the edge 136 along the central longitudinal axis 148 in a direction toward the central longitudinal axis 114 of the tool head 110.

Extending the radially outermost surface 162 of one or more of the bearings 152 enables the SSAM apparatus 100 to provide one or more of the layers 142 with a width W that is smaller than the width (e.g., the diameter, etc.) of the end surface 134 of the shoulder 130. Moreover, in some implementations, the radially outermost surface 162 of one or more of the bearings 152 is selectively moveable along the central longitudinal axis 148 during deposition of a layer 142 (i.e., as the tool head 110 moves along the substrate 102 to deposit the layer 142), for example to provide the layer 142 being deposited with a variable width W along the length of the layer 142 (e.g., a tapered width W, etc.), to provide one or both of the side surfaces 154 of the layer 142 being deposited with a scalloped and/or other non-linear profile, etc.

In some implementations, the barriers 112 are used to control a shape of the side surfaces 154 of one or more of the layers 142. For example, the radially outermost surface 162 of the one or more of the bearings 152 has concave or convex shape in some implementations to provide the corresponding side surface 154 of the layer 142 being deposited with a complementary convex or concave shape, respectively.

When depositing the first layer 142a of the structure 144, in some implementations, lower surfaces 164 (shown in FIGS. 1 and 2, but not visible in FIG. 3) of the bearings 152 are spaced apart (i.e., offset along the central longitudinal axis 114 in a direction 166) from the deposition surface 108 of the substrate 102 to prevent the substrate 102 from interfering with the rotation of the bearings 152 about the axes of rotation 156. In addition or alternatively to being spaced apart from the deposition surface 108, in some implementations the bearings 152 are provided with one or more friction reducing elements (e.g., a coating, a lubricant, etc.) to enable the bearings 152 to freely rotate about the axes of rotation 156 during deposition of the first layer 142a.

The barriers 112 are not limited to including rollers as is shown in FIGS. 1-3. Rather, in other implementations, one or more of the barriers 112 additionally or alternatively includes any other type of rolling element and/or bearing that enables the barrier 112 to function as described and/or illustrated herein. Examples of other types of rolling elements and/or bearings suitable for use as a barrier 112 include, but are not limited to, a rolling element bearing, a ball bearing, a roller bearing, and/or the like.

Figure 5:
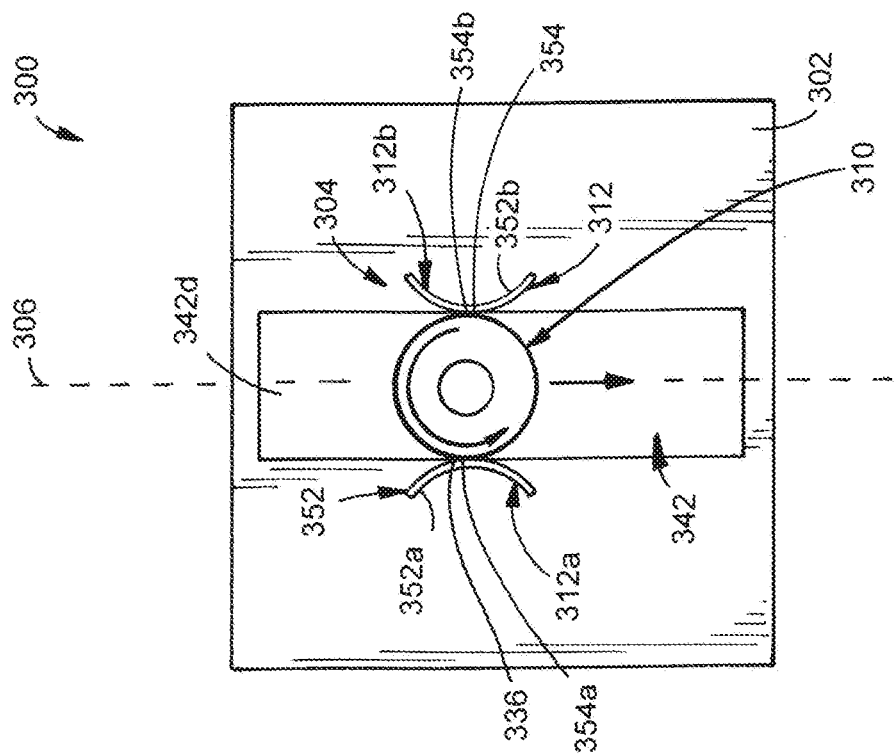
FIG. 5 is a plan view of still another implementation of an SSAM apparatus.
Figure 6:
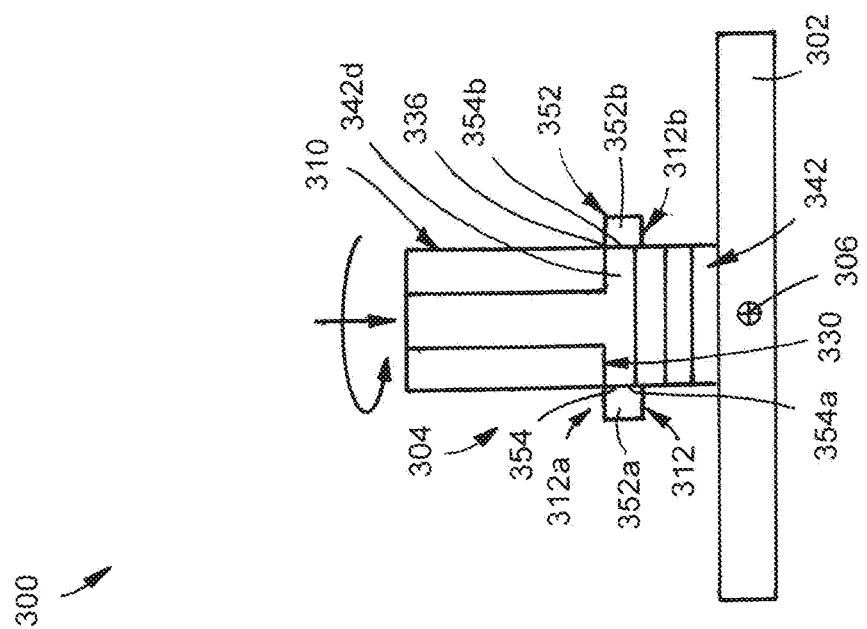
FIG. 6 is an elevational view of the SSAM apparatus shown in FIG. 5.

Moreover, the barriers 112 are not limited to including rolling elements and/or bearings, but rather other implementations of the barriers 112 include any other structure that enables the barriers 112 to function as described and/or illustrated herein. For example, FIGS. 5 and 6 illustrate another implementation of an SSAM apparatus 300. The SSAM apparatus 300 includes a tool head assembly 304 having a tool head 310 and one or more barriers 312 that reduce the amount of flash generated by the SSAM process. In the implementation shown in FIGS. 5 and 6, each barrier 312 includes a rail 352 that extends along a corresponding side surface 354 of the layer 342d being deposited. Specifically, the rail 352a of the barrier 312a extends along the side surface 354a of the layer 342d, while the rail 352b of the barrier 312b extends along the side surface 354b of the layer 342d. Each of the barriers 312a and 312b may be referred to herein as a "first" and/or a "second" barrier. Each of the side surfaces 354a and 354b may be referred to herein as a "first" and/or a "second" side surface.

In the implementation of FIGS. 5 and 6, each of the rails 352 includes a curved shape, as is best seen in FIG. 5. But, in other implementations one or more of the rails 352 extends approximately straight (e.g., approximately parallel to a central longitudinal axis 306 of a substrate 302 of the SSAM apparatus 100, etc.). The rails 352 are configured to move along with the tool head 310 as the tool head 310 moves relative to the substrate 302 to deposit the layer 342d onto the substrate 302. As the layer 342d is deposited onto the substrate 302 by the tool head 310, the rails 352a and 352b extend along the respective side surfaces 354a and 354b such that the rails 352 constrain the plasticized material of the layer 342d from extruding past an edge 336 of a shoulder 330 (as shown in FIG. 5, but not visible in FIG. 5) of the tool head 310. Specifically, the rails 352 provide physical barriers along the side surfaces 354 that reduce the amount of plasticized material that flows past the edges 336 and thereby extrudes out from under the shoulder 330. The rails 352 thus reduce the amount of flash generated as the layer 342d is deposited onto the substrate 302. Accordingly, as each successive layer 342 of the structure being built is deposited onto the substrate 302, the barriers 312 constrain plasticized material from extruding out from under the shoulder 330 and thereby reduce the amount of flash formed on the structure. In some implementations, the barriers 312 reduce the amount of flash generated by the SSAM deposition process by at least approximately 50%, between approximately 25% and approximately 75%, at least approximately 90%, and/or the like.

By reducing the amount of flash of the fully built structure, the barriers 312 reduce the duration and/or number of one or more secondary finishing processes (e.g., a machining process, etc.) that are required to finish a structure built using the SSAM apparatus 300. In some implementations, the barriers 312 eliminate the need for one or more secondary finishing processes. Accordingly, some implementations of the SSAM apparatus 300 reduce the amount of time required to build a structure using an SSAM process and/or reduce the cost of building a structure using an SSAM process.

Figure 7:
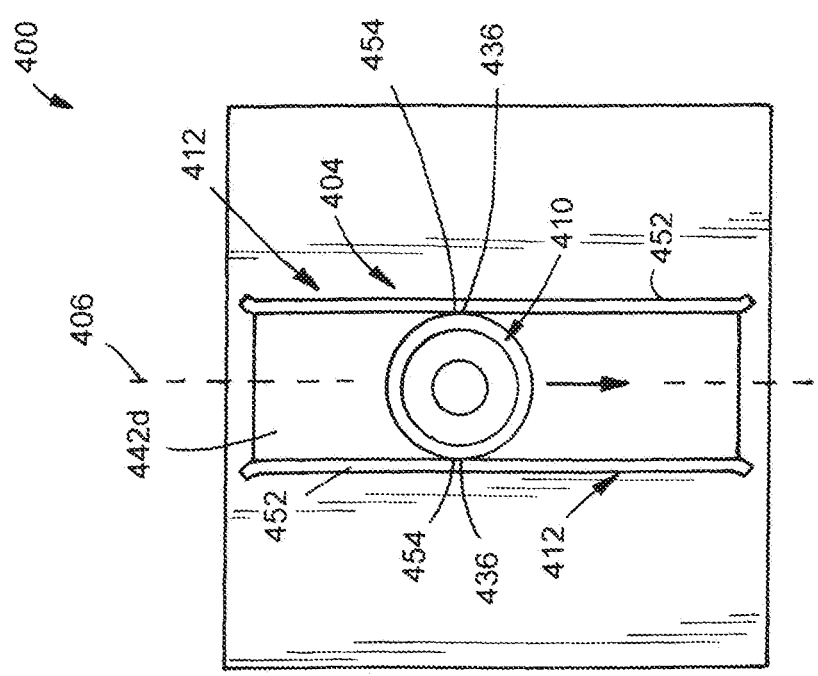
FIG. 7 is a plan view of another implementation of an SSAM apparatus.

FIG. 7 illustrates another implementation of an SSAM apparatus 400. The SSAM apparatus 400 includes a tool head assembly 404 having a tool head 410 and one or more barriers 412 that reduce the amount of flash generated by the SSAM process. In the implementation shown in FIG. 7, each barrier 412 includes a rail 452 that extends along a central longitudinal axis 406 of a substrate 402 of the SSAM apparatus 400. As is shown in FIG. 7, each rail 452 is fixed in position along the central longitudinal axis 406 such that each rail 452 extends along a corresponding side surface 454 of the layer 442d being deposited along an approximate entirety of the eventual completed length of the layer 442d. Each of the barriers 412 shown in FIG. 7 may be referred to herein as a "first" and/or a "second" barrier, while each of the side surfaces 454 shown in FIG. 7 may be referred to herein as a "first" and/or a "second" side surface.

In operation, as the layer 442d is deposited onto the substrate 402 by the tool head 410, the rails 452 extend along the side surfaces 454 such that the rails 452 constrain the plasticized material of the layer 442d from extruding past an edge 436 of a shoulder (not visible) of the tool head 410. Specifically, the rails 452 provide physical barriers along the side surfaces 454 that reduce the amount of plasticized material that flows past the edge 436 and thereby extrudes out from under the shoulder. The rails 452 thus reduce the amount of flash generated as the layer 442d is deposited onto the substrate 402. Accordingly, as each successive layer 442 of the structure being built is deposited onto the substrate 402, the barriers 412 reduce the amount of flash formed on the resulting fully built structure. In some implementations, the barriers 412 reduce the amount of flash generated by the SSAM deposition process by at least approximately 50%, between approximately 25% and approximately 75%, at least approximately 90%, and/or the like.

By reducing the amount of flash of the fully built structure, some implementations of the barriers 412 reduce the duration and/or number of one or more secondary finishing processes (e.g., a machining process, etc.) that are required to finish a structure built using the SSAM apparatus 400. In some implementations, the barriers 412 eliminate the need for one or more secondary finishing processes. Accordingly, some implementations of the SSAM apparatus 400 reduce the amount of time required to build a structure using an SSAM process and/or reduce the cost of building a structure using an SSAM process.

Figure 8:
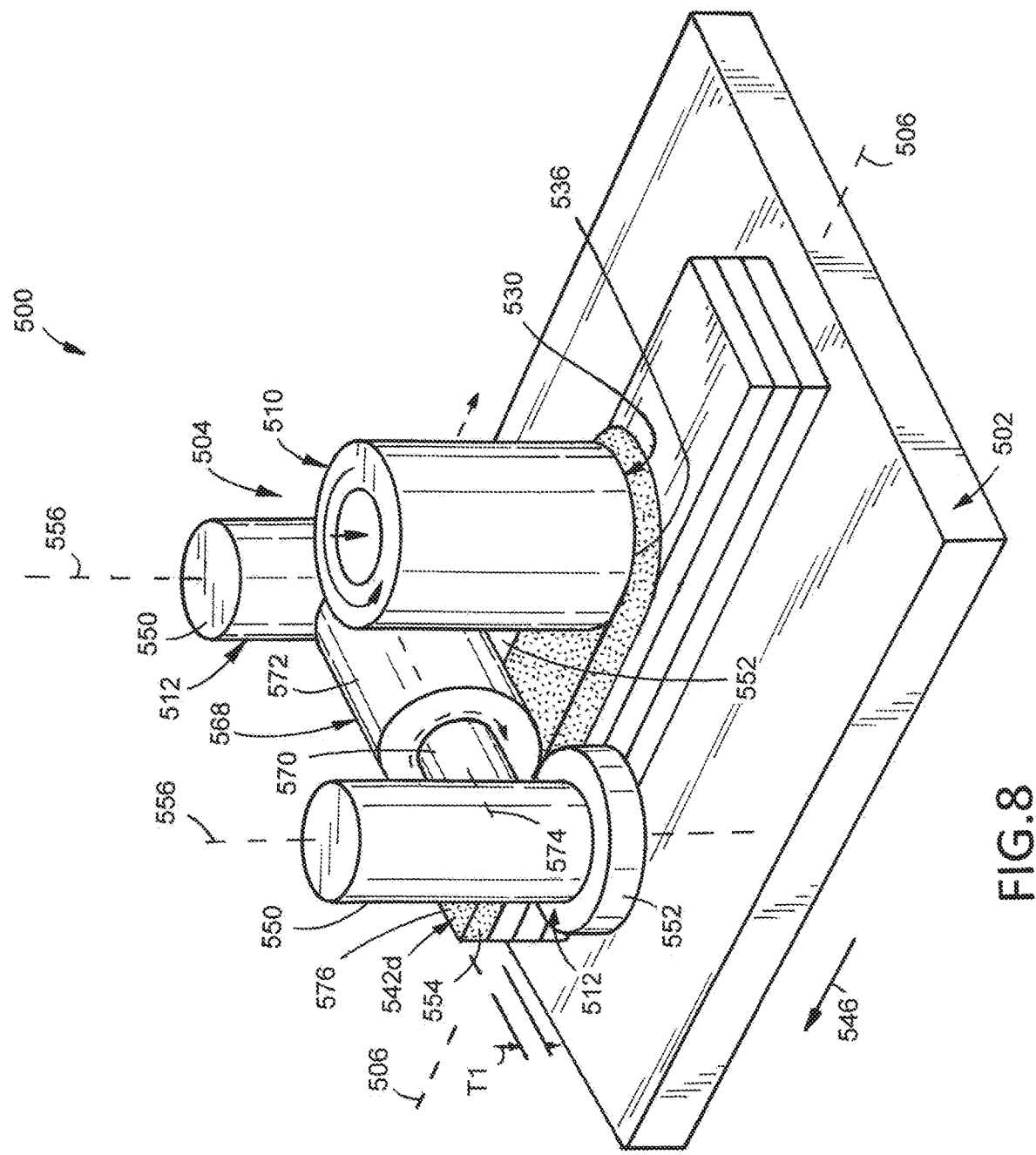
FIG. 8 is a perspective view of yet another implementation of an SSAM apparatus.

Referring again to FIGS. 1-3, the barriers 112 are positioned alongside the tool head 110 such that the barriers 112a and 112b are each aligned with the tool head 110 along the central longitudinal axis 106 of the substrate 102. FIG. 8 illustrates another implementation of an SSAM apparatus 500 wherein barriers 512 of the SSAM apparatus 500 are positioned behind a tool head 510 of the SSAM apparatus 500. Specifically, the SSAM apparatus 500 includes a tool head assembly 504 that includes the tool head 510 and one or more barriers 512 that reduce the amount of flash generated by the SSAM process. In the implementation shown in FIG. 8, each barrier 512 includes a support shaft 550 and a bearing 552 that is a roller configured to freely rotate about an axis of rotation 556. As can be seen in FIG. 8, the bearing 552 of each barrier 512 extends along a corresponding side surface 554 (only one of which is visible) of a layer 542d being deposited. Each of the barriers 512 shown in FIG. 8 may be referred to herein as a "first" and/or a "second" barrier. Each of the side surfaces 554 of the layer 542d may be referred to herein as a "first" and/or a "second" side surface.

The implementation of FIG. 8 optionally includes one or more other barriers 568. As shown herein, the one or more other barriers 568 includes a support shaft 570 and a bearing 572 that is a roller configured to freely rotate about an axis of rotation 574. But, the one or more other barriers 568 is not limited to rollers. Rather, in other implementations, the one or more other barriers 568 additionally or alternatively includes any other type of rolling element and/or bearing (e.g., a rolling element bearing, a ball bearing, a roller bearing, etc.) that enables the one or more other barriers 568 to function as described and/or illustrated herein. Moreover, the one or more other barriers 568 is not limited to including rolling elements and/or bearings, but rather other implementations of the barrier 568 include any other structure that enables the one or more other barriers 568 to function as described and/or illustrated herein.

As briefly described above, the barriers 512 of the SSAM apparatus 500 are positioned behind the tool head 510 of the SSAM apparatus 500. Specifically, the barriers 512 are offset from the tool head 510 along a central longitudinal axis 506 of a substrate 502 of the SSAM apparatus 500 in a direction of an arrow 546, as is shown in FIG. 8. As can also be seen in FIG. 8, the one or more other barriers 568 is also offset from the tool head 510 along the central longitudinal axis 506 in the direction 546. In operation, the barriers 512 and 568 move along with the tool head 510 as the tool head 510 moves relative to the substrate 502 to deposit the layer 542d onto the substrate 502. During movement along the substrate 502, the barriers 512 and 568 trail behind the tool head 510. In other words, the tool head 510 moves ahead of the barriers 512 and 568 during a deposition of the layer 542d. As the barriers 512 move behind the tool head 510, the barriers 512 constrain the plasticized material of the layer 542d from extruding past an edge 536 of a shoulder 530 of the tool head 510. The barriers 512 thus reduce the amount of flash generated as the layer 542d is deposited onto the substrate 502. Accordingly, the barriers 512 reduce the amount of flash that forms on the structure built by the SSAM apparatus 500. In some implementations, the barriers 512 reduce the amount of flash generated by the SSAM deposition process by at least approximately 50%, between approximately 25% and approximately 75%, at least approximately 90%, and/or the like.

By reducing the amount of flash generated by the SSAM process, some implementations of the barriers 512 reduce the duration and/or number of one or more secondary finishing processes (e.g., a machining process, etc.) that are required to finish a structure built using the SSAM apparatus 500. In some implementations, the barriers 512 eliminate the need for one or more secondary finishing processes. Accordingly, some implementations of the SSAM apparatus 500 reduce the amount of time required to build a structure using an SSAM process and/or reduce the cost of building a structure using an SSAM process.

As the one or more other barriers 568 moves behind the tool head 510 during the deposition of the layer 542d, the bearing 572 of the one or more other barriers 568 constrains the plasticized material of the layer 542d along an upper surface 576 of the layer 542d, for example to provide the layer 542d with a predetermined thickness Ti, to provide the upper surface 576 of the layer 542d with a predetermined surface finish, etc.

The barriers 512 and 568 are offset along the central longitudinal axis 506 from the tool head 510 at any distance that enables the barriers 512 and/or 568 to function as described herein. In some implementations, the distance of the barriers 512 and 568 along the central longitudinal axis 506 from the tool head 510 is selected based on a temperature of the SSAM process, based on the speed of the movement of the tool head 510 along the substrate 502 while depositing one or more of the layers 542, and/or the like.

Figure 9:
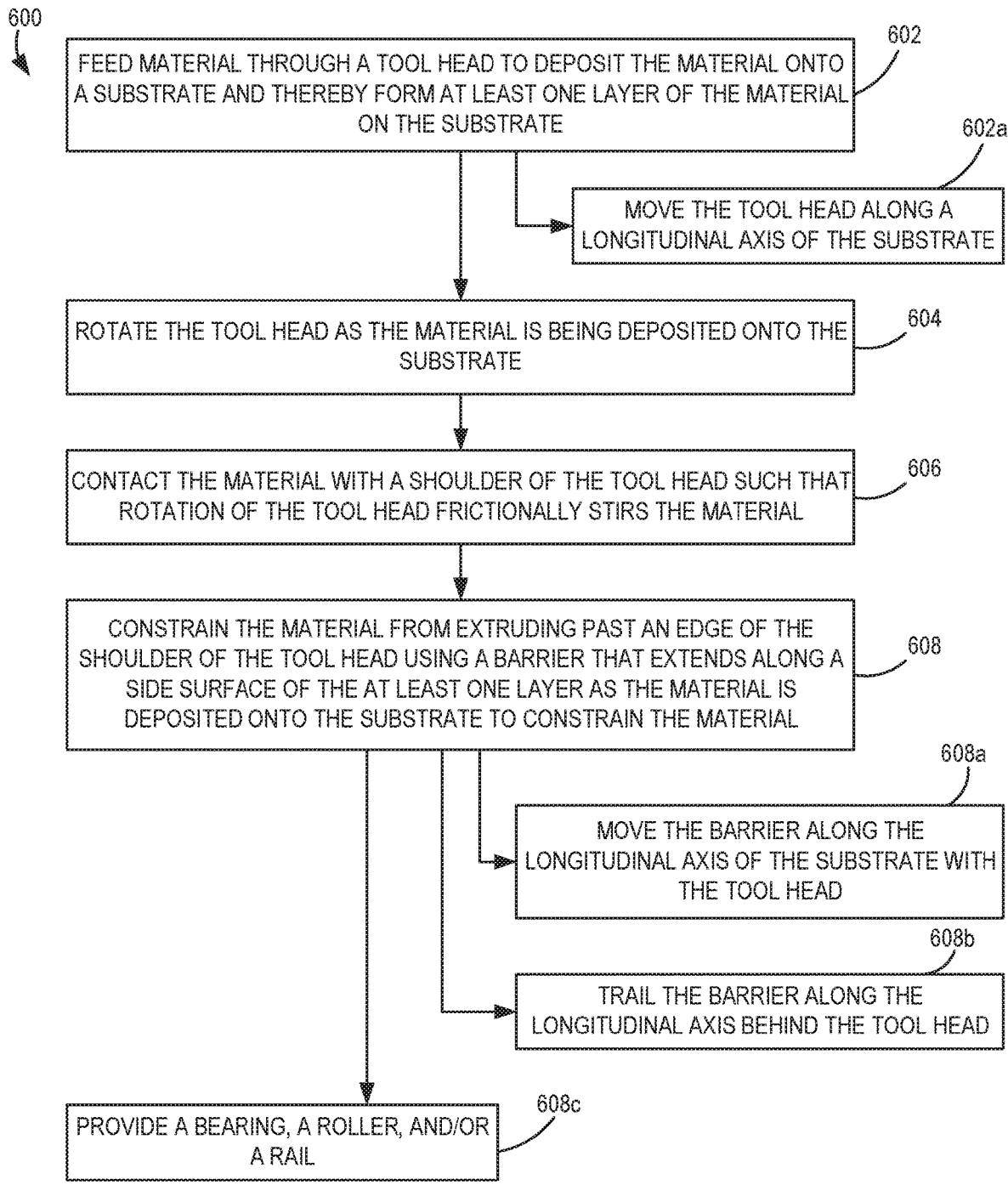
FIG. 9 is a flow chart illustrating a method for SSAM according to an implementation.

FIG. 9 is a flow chart illustrating a method 600 for SSAM according to an implementation. The method 600 includes feeding, at 602, material through a tool head to deposit the material onto a substrate and thereby form at least one layer of the material on the substrate. In some implementations, feeding at 602 the material includes moving, at 602a, the tool head along a longitudinal axis of the substrate. At 604, the method 600 includes rotating the tool head as the material is being deposited onto the substrate. At 606, the method 600 includes contacting the material with a shoulder of the tool head such that rotation of the tool head frictionally stirs the material.

The method 600 includes constraining, at 608, the material from extruding past an edge of the shoulder of the tool head using a barrier that extends along a side surface of the at least one layer as the material is deposited onto the substrate to constrain the material. In some implementations, constraining, at 608, includes moving, at 608a, the barrier along the longitudinal axis of the substrate with the tool head. Constraining, at 608, includes trailing, at 608b, the barrier along the longitudinal axis behind the tool head in some implementations. Moreover, in some implementations constraining, at 608, the includes providing, at 608c, a bearing, a roller, and/or a rail.

Figure 10:
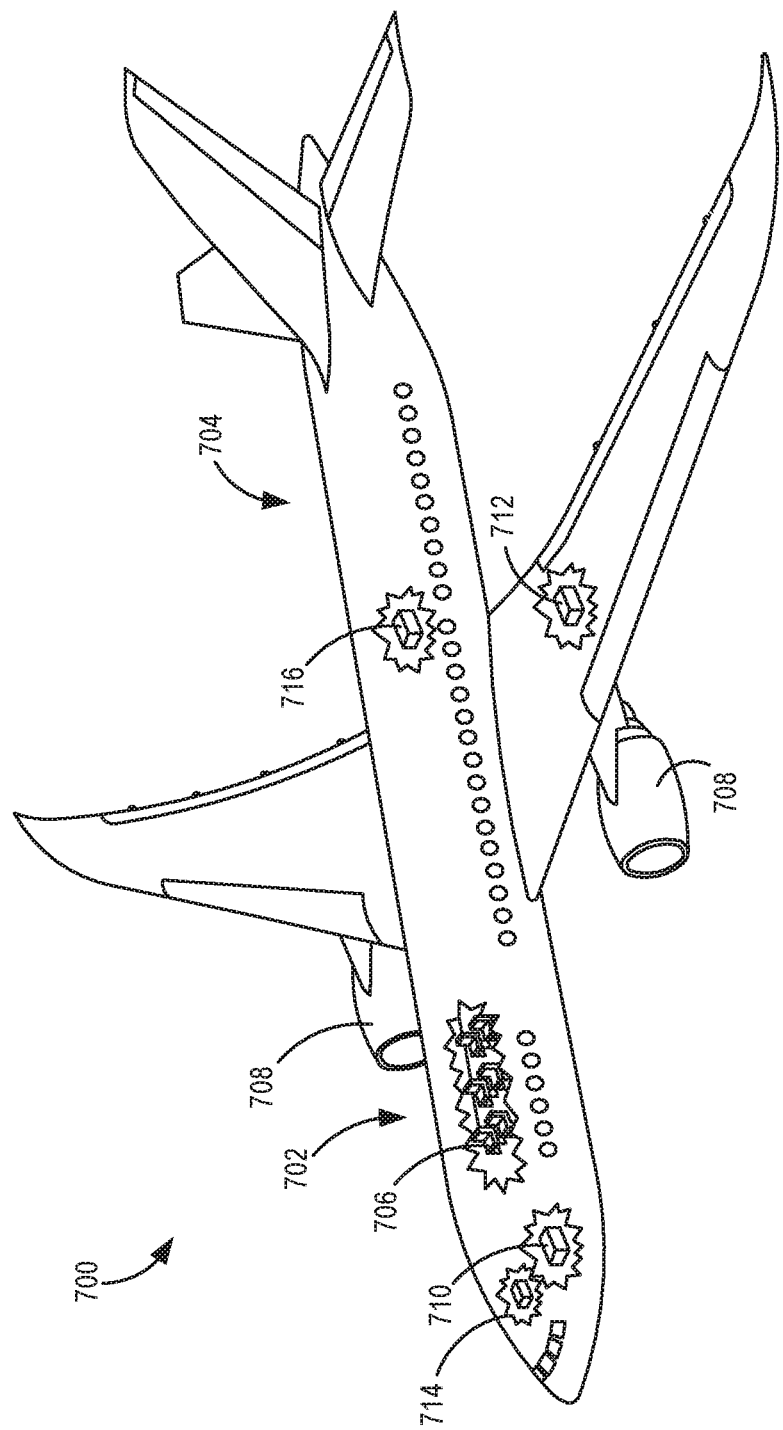
FIG. 10 is a schematic view of an implementation of an aircraft.

Referring now to FIG. 10, examples of the disclosure may be described in the context of using an SSAM process to build one or more portions of an aircraft 700 that includes an airframe 702 with a plurality of high-level systems 704 and an interior 706. Examples of high-level systems 704 include one or more of a propulsion system 708, an electrical system 710, a hydraulic fluid system 712, a control system 714, and an environmental system 716. Any number of other systems can be included. Although an aerospace example is shown, the principles can be applied to other industries, such as, but not limited to, the automotive industry, the marine industry, and/or the like.

Figure 11:
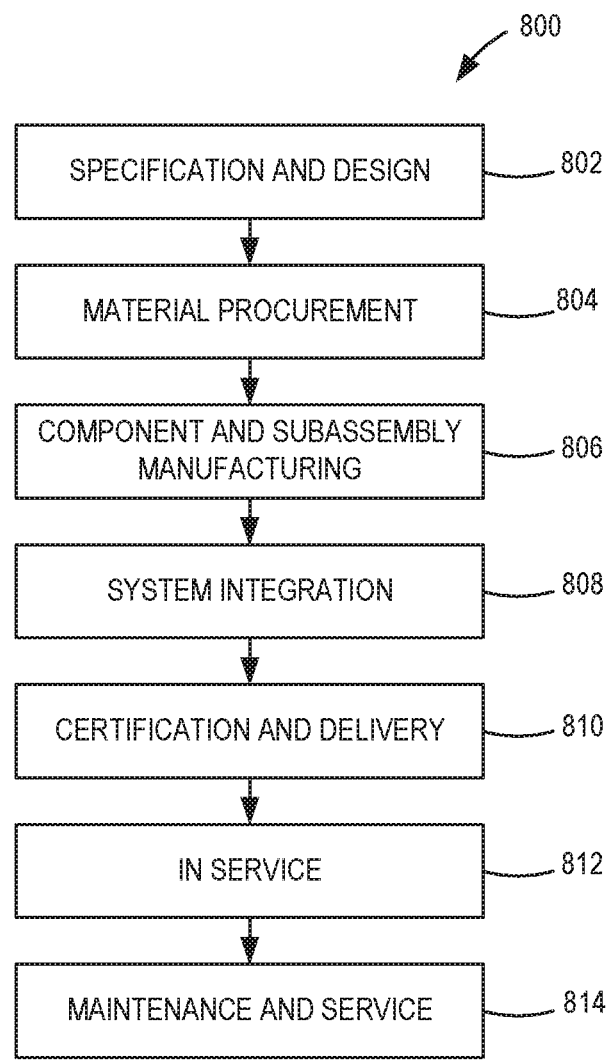
FIG. 11 is a block diagram of an implementation of an aircraft production and service methodology.

Examples of the disclosure can be described in the context of an aircraft manufacturing and service method 800 as shown in FIG. 11. During pre-production, illustrative method 800 can include specification and design 802 of an aircraft (e.g., aircraft 700 shown in FIG. 10, etc.) and material procurement 804. During production, component and subassembly manufacturing 806 and system integration 808 of the aircraft take place. Thereafter, the aircraft can go through certification and delivery 810 to be placed in service 812. While in service by a customer, the aircraft is scheduled for routine maintenance and service 814 (which can also include modification, reconfiguration, refurbishment, and so on).

Each of the processes of the illustrative method 800 can be performed or carried out by a system integrator, a third party, and/or an operator (e.g., a customer). For the purposes of this description, a system integrator can include, without limitation, any number of aircraft manufacturers and major-system subcontractors; a third party can include, without limitation, any number of vendors, subcontractors, and suppliers; and an operator can be an airline, leasing company, military entity, service organization, and so on.

It should be noted that any number of other systems can be included with the system described herein. Also, although an aerospace example is shown, the principles can be applied to other industries, such as, but not limited to, the automotive industry, the marine industry, and/or the like.

Systems and methods shown or described herein can be employed during any one or more of the stages of the manufacturing and service method 800. For example, components or subassemblies corresponding to component and subassembly manufacturing 806 can be fabricated or manufactured in a manner similar to components or subassemblies produced while the aircraft is in service. Also, one or more aspects of the system, method, or combination thereof can be utilized during the production states of subassembly manufacturing 806 and system integration 808, for example, by substantially expediting assembly of or reducing the cost of the aircraft. Similarly, one or more aspects of the apparatus or method realizations, or a combination thereof, cab be utilized, for example and without limitation, while the aircraft is in service, e.g., maintenance and service 814.

Various implementations of the present disclosure enable SSAM processes that generate less flash. Moreover, various implementations of the present disclosure reduce the duration of one or more secondary finishing processes (e.g., a machining process, etc.) that are required to finish a structure built using an SSAM process. Various implementations of the present disclosure reduce the number of secondary finishing processes that are required to finish a structure built using an SSAM process. Various implementations of the present disclosure eliminate the need for one or more secondary finishing processes. Various implementations of the present disclosure reduce the amount of time required to build a structure using an SSAM process. Further, various implementations of the present disclosure reduce the cost of building a structure using an SSAM process.

The following clauses describe further aspects:

Clause Set A:

A1. A tool head assembly for a solid state additive manufacturing apparatus, the tool head assembly comprising:

a tool head comprising a material passage configured to receive a material therein, the tool head being configured to deposit the material from the material passage onto a substrate of the solid state additive manufacturing apparatus to form at least one layer of the material on the substrate, the tool head comprising a shoulder configured to contact the material such that rotation of the tool head frictionally stirs the material; and a barrier configured to extend along a side surface of the at least one layer as the at least one layer is deposited onto the substrate such that the barrier is configured to constrain the material from extruding past an edge of the shoulder.

A2. The tool head assembly of clause A1, wherein the barrier is a first barrier and the side surface is a first side surface, the at least one layer comprising a second side surface that extends opposite the first side surface, the tool head assembly comprising a second barrier configured to extend along the second side surface of the at least one layer as the at least one layer is deposited onto the substrate.

A3. The tool head assembly of clause A1, wherein the tool head is configured to move along a longitudinal axis of the substrate as the tool head deposits the at least one layer of material on the substrate, the barrier being configured to move with the tool head along the longitudinal axis of the substrate.

A4. The tool head assembly of clause A1, wherein the barrier comprises a bearing.

A5. The tool head assembly of clause A1, wherein the barrier comprises a roller configured to freely rotate about an axis of rotation as the barrier moves along a length of the at least one layer during deposition of the at least one layer.

A6. The tool head assembly of clause A1, wherein the barrier comprises a rolling element including at least one of a roller, a rolling element bearing, a ball bearing, or a roller bearing.

A7. The tool head assembly of clause A1, wherein the barrier comprises a rail that extends along a longitudinal axis of the substrate, the rail being fixed in position along the longitudinal axis.

A8. The tool head assembly of clause A1, wherein the tool head is configured to move along a longitudinal axis of the substrate as the tool head deposits the at least one layer of material on the substrate, the barrier comprising a rail that is configured to move with the tool head along the longitudinal axis.

A9. The tool head assembly of clause A1, wherein the tool head is configured to move along a longitudinal axis of the substrate as the tool head deposits the at least one layer of material on the substrate, the barrier comprising a rail that is configured to move along with the tool head along the longitudinal axis, the rail comprising a curved shape.

A10. The tool head assembly of clause A1, wherein the tool head is configured to move along a longitudinal axis of the substrate as the tool head deposits the at least one layer of material on the substrate, the barrier being positioned alongside the tool head such that the barrier is aligned with the tool head along the longitudinal axis.

A11. The tool head assembly of clause A1, wherein the tool head is configured to move along a longitudinal axis of the substrate as the tool head deposits the at least one layer of material on the substrate, the barrier being positioned behind the tool head along the longitudinal axis.

Clause Set B:

B1. A solid state additive manufacturing apparatus comprising:
a substrate;
a tool head comprising a material passage configured to receive a material therein, the tool head being configured to deposit the material from the material passage onto the substrate to form at least one layer of the material on the substrate, the tool head comprising a shoulder configured to contact the material such that rotation of the tool head frictionally stirs the material; and
a barrier configured to extend along a side surface of the at least one layer as the at least one layer is deposited onto the substrate such that the barrier is configured to constrain the material from extruding past an edge of the shoulder.

B2. The solid state manufacturing apparatus of clause B1, wherein the barrier is a first barrier and the side surface is a first side surface, the at least one layer comprising a second side surface that extends opposite the first side surface, the tool head comprising a second barrier configured to extend along the second side surface of the at least one layer as the at least one layer is deposited onto the substrate.

B3. The solid state manufacturing apparatus of clause B1, wherein the substrate extends along a extends along a longitudinal axis, the tool head being configured to move along the longitudinal axis of the substrate as the tool head deposits the at least one layer of material on the substrate, the barrier being configured to move with the tool head along the longitudinal axis of the substrate.

B4. The solid state manufacturing apparatus of clause B1, wherein the barrier comprises a roller configured to freely rotate about an axis of rotation as the barrier moves along a length of the at least one layer during deposition of the at least one layer.

B5. The solid state manufacturing apparatus of clause B1, wherein the barrier comprises at least one of a rail or a rolling element.

Clause Set C:

C1. A method for solid state additive manufacturing comprising:
feeding material through a tool head to deposit the material onto a substrate and thereby form at least one layer of the material on the substrate;
rotating the tool head as the material is being deposited onto the substrate;
contacting the material with a shoulder of the tool head such that rotation of the tool head frictionally stirs the material; and
constraining the material from extruding past an edge of the shoulder of the tool head using a barrier that extends along a side surface of the at least one layer as the material is deposited onto the substrate to constrain the material.

C2. The method of clause C1, wherein feeding the material comprises moving the tool head along a longitudinal axis of the substrate, and wherein constraining the material comprises moving the barrier along the longitudinal axis of the substrate with the tool head.

C3. The method of clause C1, wherein the barrier comprises providing at least one of a bearing, a roller, or a rail.

C4. The method of clause C1, wherein feeding the material comprises moving the tool head along a longitudinal axis of the substrate, and wherein constraining the material comprises trailing the barrier along the longitudinal axis behind the tool head.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

Any range or value given herein can be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above can relate to one embodiment or can relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute means for dual use of a hydraulic accumulator.

The term "comprising" is used in this specification to mean including the feature(s) or act(s) followed thereafter, without excluding the presence of one or more additional features or acts.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing a particular operation before, contemporaneously with, or after another operation (e.g., different steps) is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there can be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are example embodiments. Many other embodiments will be apparent to those of ordinary skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person of ordinary skill in the art to practice the various embodiments of the disclosure, including making and using any devices or systems and performing any incorporated methods. The patentable scope of the various embodiments of the disclosure is defined by the claims, and can include other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A tool head assembly for a solid state additive manufacturing apparatus, the tool head assembly comprising:
    a tool head comprising a material passage configured to receive a material therein, the tool head being configured to deposit the material from the material passage onto a substrate of the solid state additive manufacturing apparatus to form at least one layer of the material on the substrate, the tool head comprising a shoulder configured to contact the material such that rotation of the tool head frictionally stirs the material;
    a first barrier and a second barrier configured to extend along a corresponding side surface of the at least one layer as the at least one layer is deposited onto the substrate such that the first barrier and the second barrier are configured to constrain the material from extruding past an edge of the shoulder; and
    a third barrier configured to extend between the first barrier and the second barrier and to the first barrier and the second barrier, the third barrier constraining the at least one layer to a particular thickness as the at least one layer is deposited onto the substrate, the third barrier extending to a side surface of the material and the third barrier further configured to rotate about an axis of rotation.

2. The tool head assembly of claim 1, each of the first barrier and the second barrier is a roller that is configured to freely rotate about an axis of rotation in an opposite direction of a rotation of the third barrier.

3. The tool head assembly of claim 1, wherein the tool head is configured to move along a longitudinal axis of the substrate as the tool head deposits the at least one layer of the material on the substrate.

4. The tool head assembly of claim 1, wherein each of the first barrier, second barrier, and the third barrier comprises a bearing.

5. The tool head assembly of claim 1, wherein each of the first barrier, the second barrier, and the third barrier is a ball bearing that is configured to freely rotate about an axis of rotation.

6. The tool head assembly of claim 1, wherein each of the first barrier, the second barrier, and the third barrier comprises a rolling element including one or more of the following: a roller, a rolling element bearing, a ball bearing, and a roller bearing.

7. The tool head assembly of claim 1, wherein each of the first barrier and the second barrier comprises a bearing with a height that is equal to or greater than a thickness of the at least one layer.

8. The tool head assembly of claim 1, wherein the tool head is configured to move along a longitudinal axis of the substrate ahead of the first barrier, the second barrier, and the third barrier as the tool head deposits the at least one layer of the material on the substrate.

9. The tool head assembly of claim 1, wherein the first barrier, the second barrier, and the third barrier are positioned a particular distance from the tool head along a central longitudinal axis based on a temperature of the material being deposited on the substrate.

10. The tool head assembly of claim 9, wherein the first barrier, the second barrier, and the third barrier are positioned the particular distance from the tool head along a central longitudinal axis further based on a speed of movement of the tool head along the substrate.

11. The tool head assembly of claim 1, wherein the tool head is configured to move along a longitudinal axis of the substrate as the tool head deposits the at least one layer of the material on the substrate, the first barrier, the second barrier, and the third barrier being positioned behind the tool head along the longitudinal axis of the substrate.

12. A solid state additive manufacturing apparatus comprising:
    a substrate;
    a tool head comprising a material passage configured to receive a material therein, the tool head being configured to deposit the material from the material passage onto the substrate to form at least one layer of the material on the substrate, the tool head comprising a shoulder configured to contact the material such that rotation of the tool head frictionally stirs the material;
    a first barrier configured to extend along a first side surface of the at least one layer as the at least one layer is deposited onto the substrate such that the first barrier is configured to constrain the material from extruding past an edge of the shoulder;
    a second barrier configured to extend along a second side surface opposite the first side surface of the at least one layer as the at least one layer is deposited onto the substrate such that the second barrier is configured to constrain the material from extruding past an edge of the shoulder; and
    a third barrier configured to extend between the first barrier and the second barrier and to the first barrier and the second barrier, the third barrier constraining the at least one layer to a particular thickness as the at least one layer is deposited onto the substrate, the third barrier extending to a side surface of the material and the third barrier further configured to rotate about an axis of rotation.

13. The solid state manufacturing apparatus of claim 12, wherein each of the first barrier, the second barrier, and the third barrier is a roller that is configured to freely rotate about an axis of rotation.

14. The solid state manufacturing apparatus of claim 12, wherein the substrate extends along a longitudinal axis, the tool head being configured to move along the longitudinal axis of the substrate as the tool head deposits the at least one layer of the material on the substrate, each of the first barrier, the second barrier, and the third barrier is a roller that is configured to freely rotate about an axis of rotation being configured to move with the tool head along the longitudinal axis of the substrate.

15. The solid state manufacturing apparatus of claim 12, wherein each of the first barrier, the second barrier, and the third barrier is a ball bearing that is configured to freely rotate about an axis of rotation.

16. The solid state manufacturing apparatus of claim 12, wherein each of the first barrier and the second barrier comprises a bearing with a height that is equal to or greater than a thickness of the at least one layer.

17. A method for solid state additive manufacturing comprising:
    feeding a material through a tool head to deposit the material onto a substrate and thereby form at least one layer of the material on the substrate;
    rotating the tool head as the material is being deposited onto the substrate;
    contacting the material with a shoulder of the tool head such that rotation of the tool head frictionally stirs the material;
    constraining the material from extruding past an edge of the shoulder of the tool head using a first barrier and a second barrier that extend along opposing side surfaces of the at least one layer as the material is deposited onto the substrate to constrain the material; and
    constraining the material from extruding past a particular thickness as the at least one layer is deposited onto the substrate using a third barrier that extends between the first barrier and the second barrier and to the first barrier and the second barrier, the third barrier extending to a side surface of the material and the third barrier further configured to rotate about an axis of rotation.

18. The method of claim 17, wherein the first barrier, the second barrier, and the third barrier are positioned a particular distance from the tool head along a central longitudinal axis based on a temperature of the material being deposited on the substrate.

19. The method of claim 18, wherein the first barrier, the second barrier, and the third barrier are positioned the particular distance from the tool head along the central longitudinal axis further based on a speed of movement of the tool head along the substrate.

20. The method of claim 17, wherein feeding the material comprises moving the tool head along a longitudinal axis of the substrate, and wherein constraining the material comprises trailing the first barrier, the second barrier, and the third barrier along the longitudinal axis of the substrate behind the tool head.

* * * * *